(12) United States Patent
Lin et al.

(10) Patent No.: US 9,721,358 B2
(45) Date of Patent: Aug. 1, 2017

(54) METHOD, SYSTEM, AND NON-TRANSITORY COMPUTER READABLE MEDIUM FOR VIDEO-BASED CIRCULAR OBJECT LOCALIZATION

(71) Applicants: EXCELSIUS MEDICAL CO., LTD., Tainan (TW); SOUTHERN TAIWAN UNIVERSITY OF SCIENCE AND TECHNOLOGY, Tainan (TW)

(72) Inventors: Horng-Horng Lin, Tainan (TW); Kuo-Chih Chiu, Tainan (TW)

(73) Assignees: Excelsius Medical Co., Ltd., Tainan (TW); Southern Taiwan University of Science and Technology, Tainan (TW)

( * ) Notice: Subject to any disclaimer, the term of this patent is extended or adjusted under 35 U.S.C. 154(b) by 89 days.

(21) Appl. No.: 14/825,288

(22) Filed: Aug. 13, 2015

(65) Prior Publication Data
US 2017/0046851 A1    Feb. 16, 2017

(51) Int. Cl.
*G06T 7/60* (2017.01)
*G06T 7/64* (2017.01)
*G06T 7/12* (2017.01)

(52) U.S. Cl.
CPC .............. *G06T 7/64* (2017.01); *G06T 7/12* (2017.01); *G06T 2207/30041* (2013.01)

(58) Field of Classification Search
CPC .......... G06T 7/13; G06T 7/136; G06T 7/181; G06T 7/50; G06T 7/60; G06T 7/62; G06T 2207/30041; G06K 9/0061; G06K 9/4604; G06K 9/4638; G06K 9/48
See application file for complete search history.

(56) References Cited

U.S. PATENT DOCUMENTS

| | | | |
|---|---|---|---|
| 6,859,555 B1* | 2/2005 | Fang et al. | 382/203 |
| 2001/0005431 A1* | 6/2001 | Mori | 382/199 |
| 2006/0098867 A1* | 5/2006 | Gallagher | 382/167 |
| 2016/0014121 A1* | 1/2016 | Perna et al. | H04L 63/0861 726/4 |

* cited by examiner

*Primary Examiner* — Andrew W Johns
(74) *Attorney, Agent, or Firm* — Rosenberg, Klein & Lee

(57) ABSTRACT

A method and a system for localizing at least one circular object in a video frame captured by an image capture unit are disclosed. The method includes the steps of: A. performing edge detection to obtain a plurality of image edge points in the video frame; B. extracting a contour set of image contours by linking neighboring edge points; C. generating a plurality of circle samples from the extracted contour set by a structural sampling process; and D. localizing the at least one circular object from the generated circle samples by calculating a respective fitness score for each of the circle samples to measure the supporting evidence of the image edge points on a neighborhood of each of the circle samples, and by choosing the circle sample(s) whose fitness score(s) is/are greater than a threshold value as the circular object(s) found in the video frame.

16 Claims, 13 Drawing Sheets

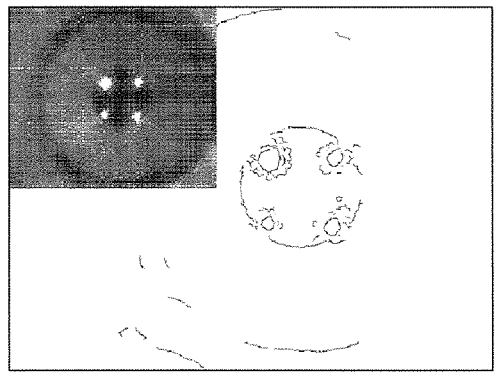
F I G . 1A
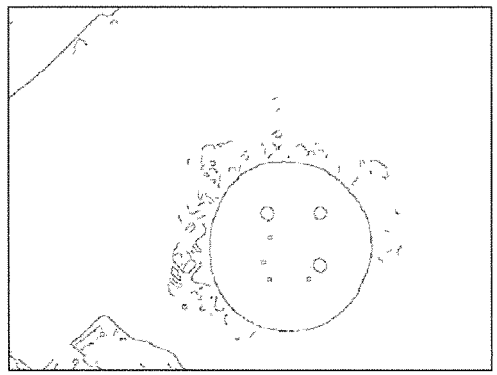
F I G . 1B
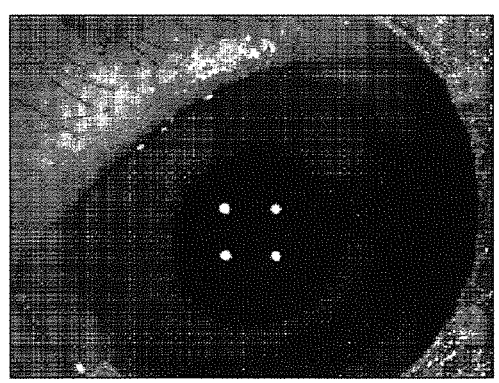
F I G . 1C
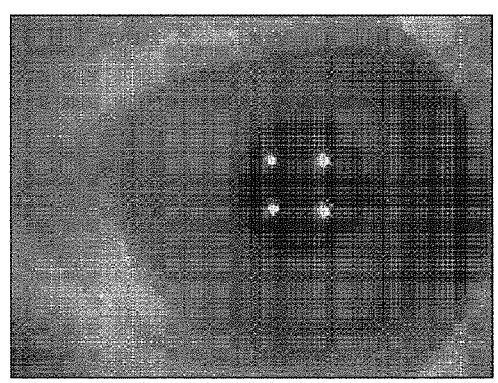
F I G . 1D

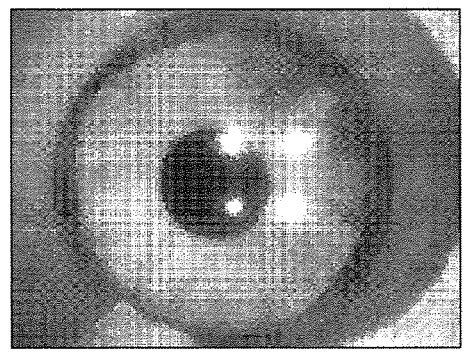
F I G . 6A
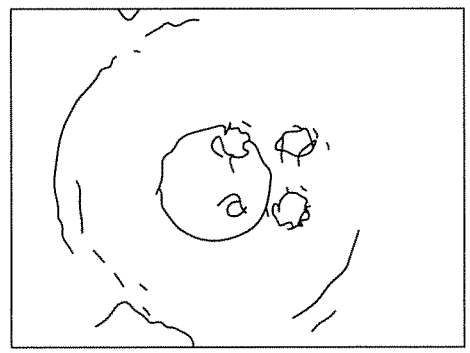
F I G . 6B
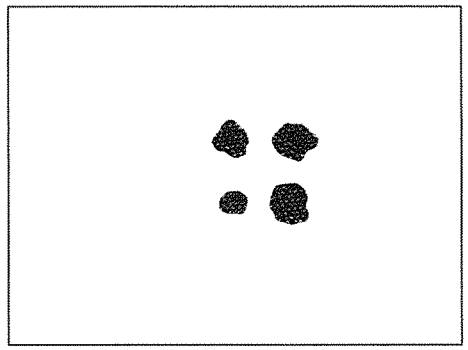
F I G . 6C
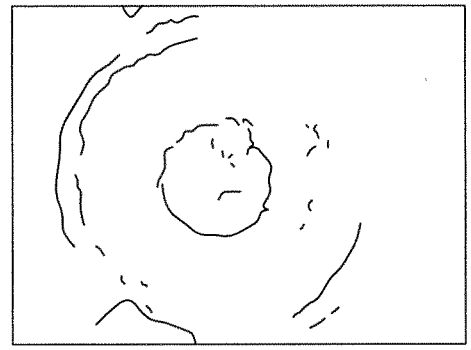
F I G . 6D
F I G . 6E

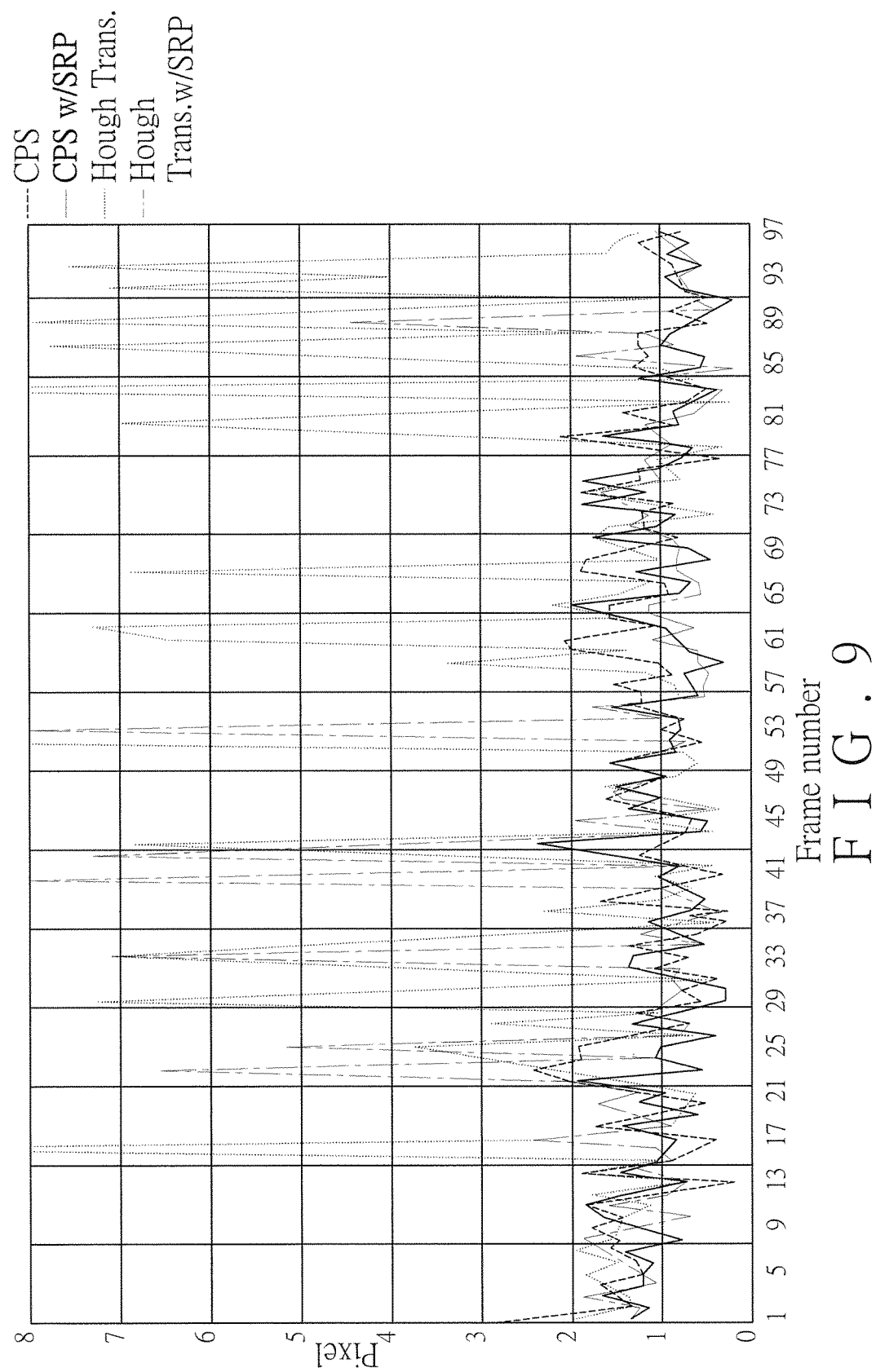
F I G. 9

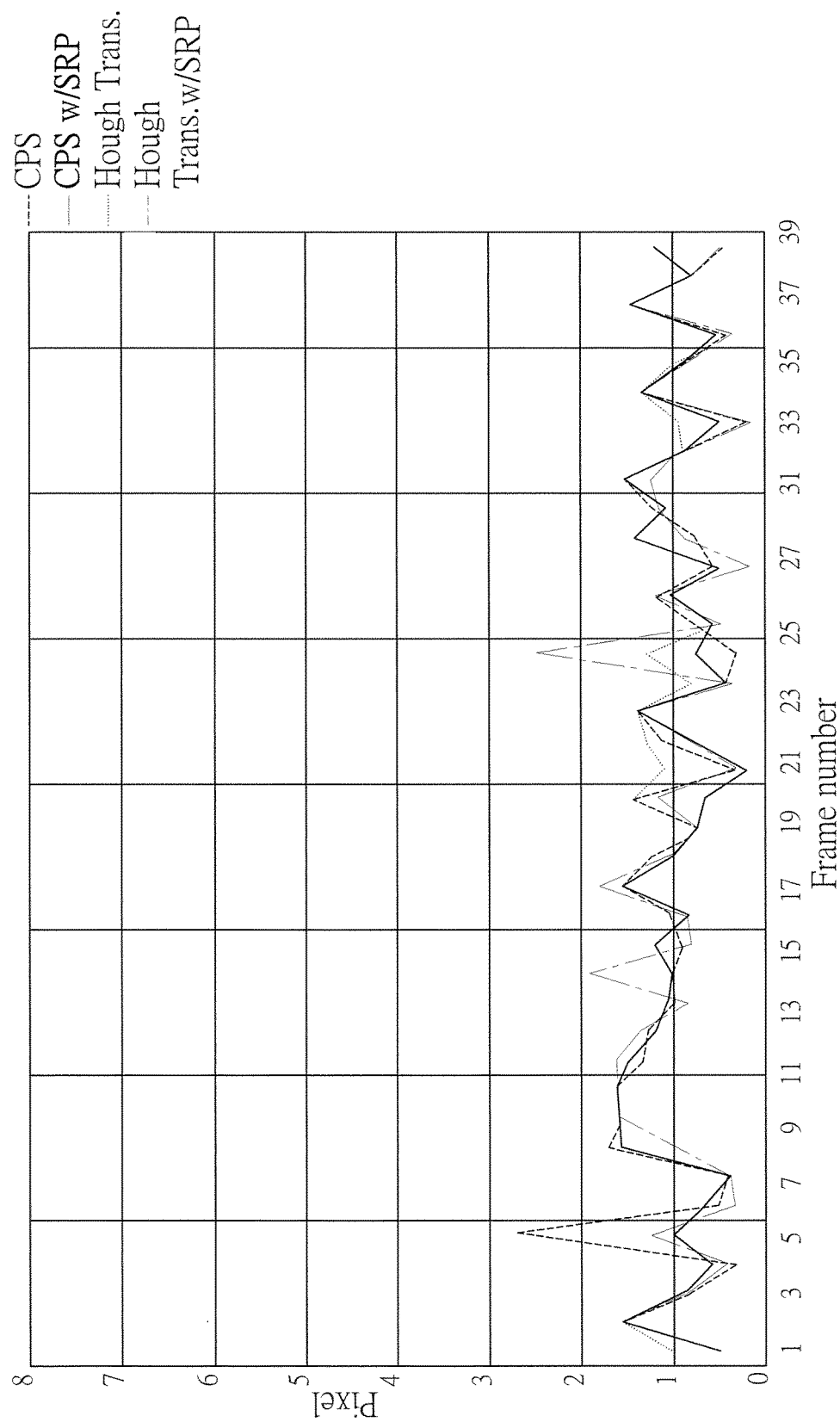
F I G. 13

METHOD, SYSTEM, AND NON-TRANSITORY COMPUTER READABLE MEDIUM FOR VIDEO-BASED CIRCULAR OBJECT LOCALIZATION

BACKGROUND OF THE INVENTION

1. Technical Field

The present invention relates to a method and a system for localizing circular objects in video frames captured by an image capture unit, which can be applied, in particular, to pupil localization for eye surgery using excimer laser.

2. Description of Related Art

Excimer laser-assisted eye surgery is a common and effective procedure for treating visual impairments such as myopia, hyperopia, and astigmatism. During the procedure, however, the eye operated on may move unconsciously such that a positioning error of pupil center may occur. The error may keep the cornea in surgery from having the intended shape and thus compromise the result of the treatment. Such a positioning error of pupil center can be reduced by auxiliary eye stabilizer equipped with video-based, real-time eye tracker.

Locating the center of a pupil accurately in real time in the development of a video-based eye tracker is a challenging task. For example, several challenging problems may affect the tracking accuracies of pupil centers in video frames, including the following: referring to FIG. 1A, the detected edge of a pupil may be fragmented due to specular reflections of supportive light; referring to FIG. 1B, iris textures may hinder the tracker from determining the true edge boundary of a pupil; referring to FIG. 1C, uneven lighting conditions from the surrounding environment may degrade the accuracy of pupil circle estimation; and referring to FIG. 1D, a pupil image may be blur due to defocus, eye movements and/or surgical smokes.

While many eye detection and tracking techniques, such as those discussed in D. Hansen and Q. Ji, "In the eye of the beholder: A survey of models for eyes and gaze," *IEEE Trans. Pattern Analysis and Machine Intelligence*, vol. 32, no. 3, pp. 478-500, 2010, have been developed for gaze detection and/or iris recognition, few of them are used in medical applications and report high localization accuracy in tracking pupil centers. Moreover, the challenging problems for video-based pupil localization, as shown in FIGS. 1A-1D, are rarely discussed in the related prior art.

BRIEF SUMMARY OF THE INVENTION

In one aspect of the present invention, a video-based circular object localization method, which is applicable to accurately localizing a pupil undergoing an eye surgery, is provided. Preferably, the present invention of circular object localization includes the steps of: A. performing edge detection to obtain a plurality of image edge points in the video frame; B. extracting a contour set of image contours by linking neighboring image edge points; C. generating a plurality of circle samples from the extracted contour set by a structural sampling process; and D. localizing circular object(s) from the generated circle samples by calculating a respective fitness score for each of the circle samples to measure the supporting evidence of image edge points on a neighborhood of each of the circle samples, and by choosing the circle sample(s) whose fitness score(s) is/are greater than a threshold value as the circular object(s) found in the video frame. When applying the present invention to pupil localization, the proposed method achieves a small error, i.e., about 1 pixel, in average in localizing pupil centers in our experiments. The experimental results validate the effectiveness of the present invention that adopts the novel idea of structural sampling on image contours for accurate circular object localization in video frames.

It should be noted this Brief Summary is provided to generally introduce the reader to one or more select concepts described below in the Detailed Description in a simplified form. This Brief Summary is not intended to identify key and/or required features of the claimed subject matter, nor is it intended to be used as an aid in determining the scope of the claimed subject matter.

BRIEF DESCRIPTION OF THE DRAWINGS

FIG. 1A shows fragmented pupil edges resulting from specular reflections of supportive light equipped on a camera;

FIG. 1B shows a case of detected image edges in a video frame, in which iris textures are located around the edge of a pupil;

FIG. 1C shows an eye image taken under an uneven lighting condition;

FIG. 1D shows an eye image in slight blur;

FIG. 6A shows an example of an eye image obtained by an image capture unit;

FIG. 6B shows the Canny edge detection result of the eye image of FIG. 6A;

FIG. 6C shows the specular regions extracted from the eye image of FIG. 6A;

FIG. 6D shows the result of performing an intersection operation on FIG. 6B and FIG. 6C;

FIG. 6E shows the remaining image edge points by eliminating the image edge points in FIG. 6D that are far from identified dark areas of probable pupil regions;

FIG. 9 shows the experimental comparison of the errors of pupil center localization for the video frames in the benchmark video 1 using four different methods, namely the Hough transform method without and with specular region processing (SRP) and the proposed contour point sampling method without and with specular region processing (SRP);

FIG. 13 shows the experimental comparison of the errors of pupil center localization for the video frames in the benchmark video 5 using four different methods, namely the Hough transform method without and with specular region processing (SRP) and the proposed contour point sampling method without and with specular region processing (SRP).

DETAILED DESCRIPTION OF THE INVENTION

The present invention provides a method, system, and a non-transitory computer readable medium for localizing at least one circular object in a video frame. The major effects of the present invention can be clearly known from the following embodiments.

Figures 2A, 2B:
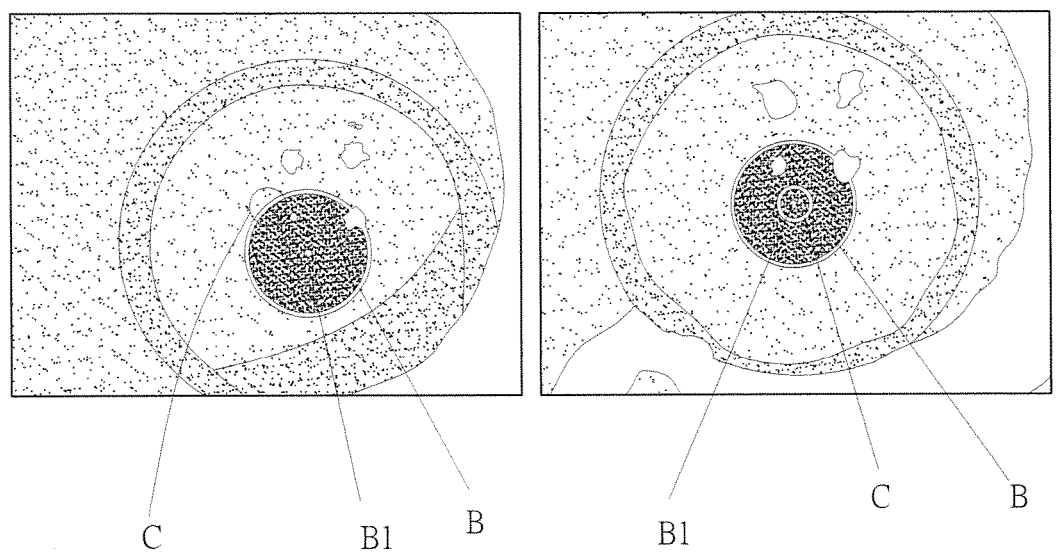
FIG. 2A is a schematic drawing showing that the laser operation zone in circle has not yet been positioned to the center of a pupil.
FIG. 2B is a schematic drawing showing that the laser operation zone in circle encloses the center of the pupil.
Figure 3:
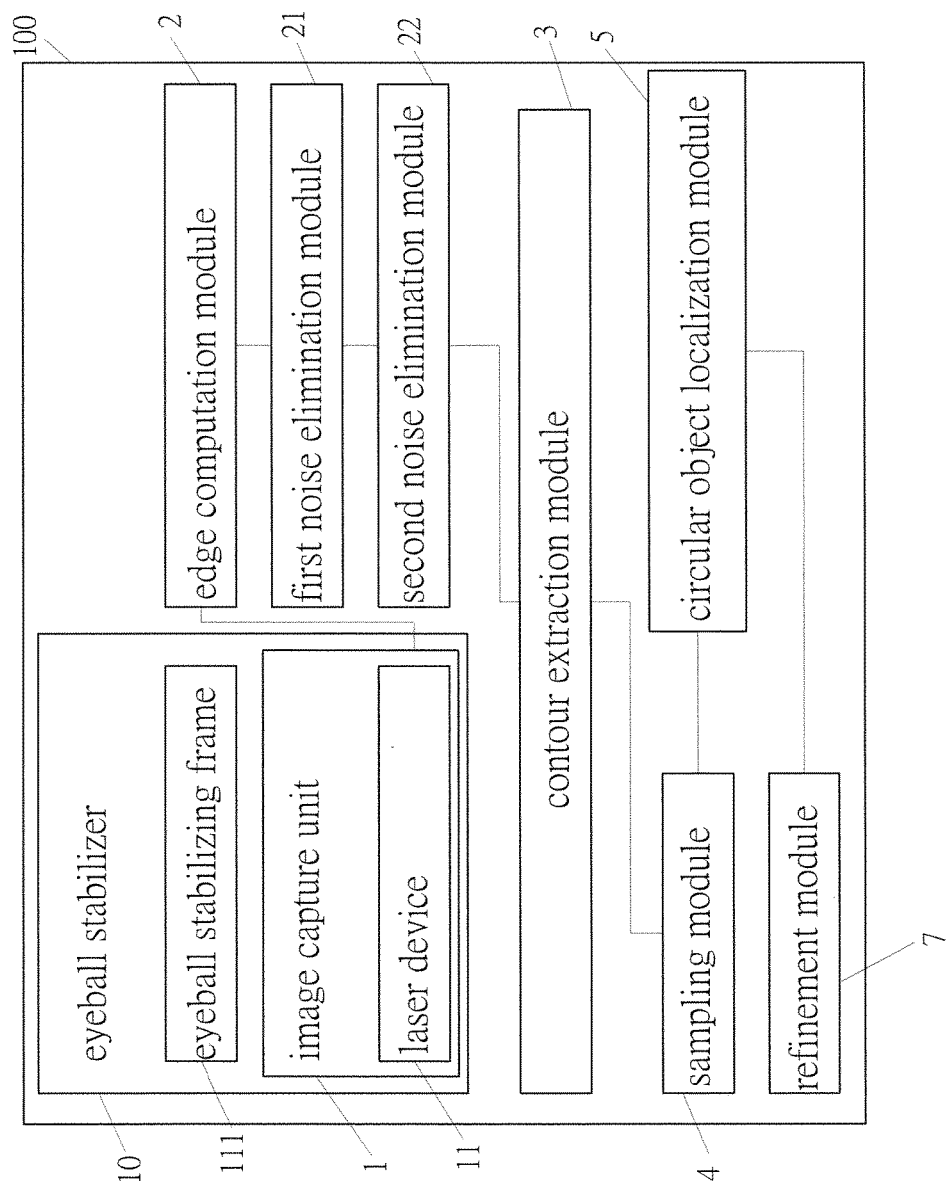
FIG. 3 schematically shows the system components in accordance with an embodiment of the present invention.

Referring to FIG. 2A, FIG. 2B, and FIG. 3, the system 100 for localizing an image of a circular object in an embodiment of the present invention serves to determine a central position B1 of at least one circular object B in a video frame. In this embodiment, the video frame is an image of an eye captured by an image capture unit 1 with supportive light. Further, the circular object B is the pupil of the eye, and the operation zone C of a laser device 11 is to be controlled to match the central position B1 of the pupil of the eye in order to perform an eye surgery. It is understood, however, that the system 100 can be applied to other application fields as well. For example, the system 100 can be applied to industrial inspection to determine the precision of a circular workpiece. In FIGS. 2A and 2B, the circular object B has a contour of a substantially constant curvature (non-linear), and the contour is generally closed. However, the present invention imposes no limitation in this regard. For example, the contour can be a semicircular arc, a quarter of the circumference of a circle, or other contours whose curvatures vary pixel-wise.

Figure 4:
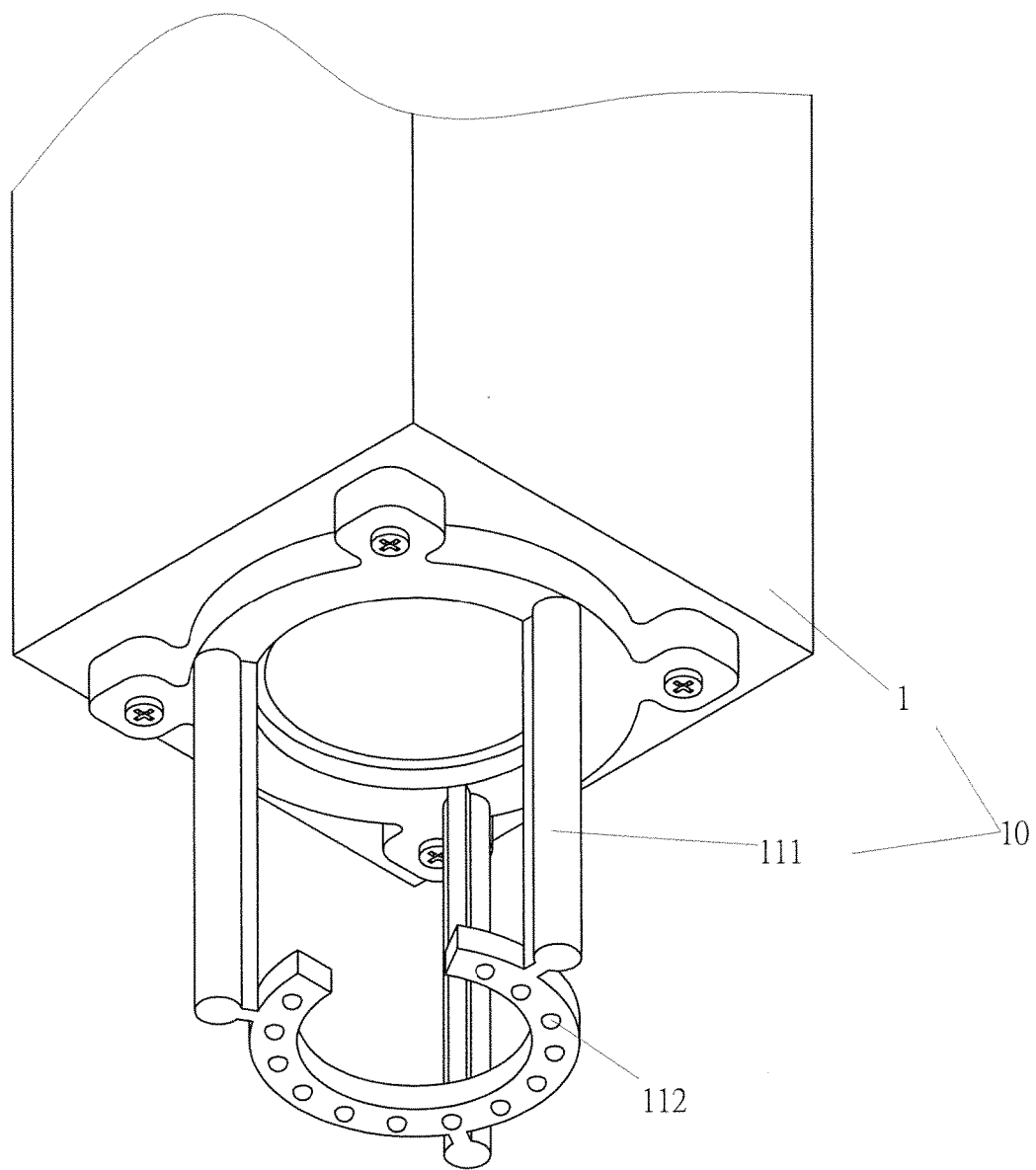
FIG. 4 is the 3D drawing of an eyeball stabilizer in accordance with an embodiment of the present invention.

Preferably, referring also to FIG. 3 and FIG. 4, the pupil localization system 100 in FIG. 3 comprises an eyeball stabilizer 10 whose 3D drawing is depicted in FIG. 4. The eyeball stabilizer 10, as shown in FIG. 4, comprises the image capture unit 1 and the laser device 11 co-located in the image capture unit 1 that is configured to perform laser surgery and to obtain video frames of an eye. The eyeball stabilizer 10 further comprises an eyeball stabilizing frame 111 for contact with an eyeball to keep the pupil of the eyeball at a predetermined position so that the eye can be inspected and treated. Particularly, the eyeball stabilizing frame 111 has a plurality of studs 112 circumferentially arranged for contact with an eyeball. Guided by the eye video with real-time pupil localization performed by the system 100, a surgeon can precisely land the eyeball stabilizer on the operation zone of the cornea for laser operations.

Referring to FIG. 3, the system 100 for real-time pupil localization comprises the basic processing modules of the image capture unit 1, an edge computation module 2, a contour extraction module 3, a sampling module 4, and a circular object localization module 5.

The edge computation module 2 is coupled to the image capture unit 1 and is configured to perform edge detection so as to obtain a plurality of image edge points in the video frame captured by the image capture unit 1.

Preferably, the edge computation module 2 is an image edge detector performing the Canny edge detection algorithm.

Preferably, the system 100 may further comprise a first noise elimination module 21 and a second noise elimination module 22. The first noise elimination module 21 is coupled to the edge computation module 2 and is configured to perform a noise elimination means for removing image edge points whose locations are within a predetermined range around the boundaries of bright image regions that are identified as probable specular reflections of the supportive light of the image capture unit 1 from an eye surface. The second noise elimination module 22 is also coupled to the edge computation module 2 and is configured to perform a noise elimination means for removing non-pupil image edge points whose locations are beyond a predetermined range around the boundaries of dark image regions that are identified as probable dark pupil areas.

The contour extraction module 3 is coupled to the edge computation module 2 and is configured for linking neighboring image edge points to form an image contour set $\Phi=\{\phi_1, \ldots, \phi_l\}$ consisting of saying l image contours $\phi$.

The sampling module 4 is coupled to the contour extraction module 3 and is configured for generating a plurality of circle samples according to the image contours $\phi$ by a structural sampling process.

The circular object localization module 5 is coupled to the sampling module 4 and is configured for calculating a respective fitness score for each of the circle samples by measuring the supporting evidence of the image edge points on a neighborhood of the circumference of each of the circle samples, and for choosing the circle sample(s) whose fitness score(s) is/are greater than a threshold value as the circular object(s) B (e.g., the pupil) found in the video frame.

Preferably, the system 100 further comprises a refinement module 7 coupled to the circular object localization module 5 and configured to apply a method of the least-square fitting of circle for refining the estimation accuracies of circle center(s) and radius(es) of the circular object(s) found in the video frame by using the image edge points around the circular object(s) derived by the circular object localization module 5 for the fitting.

Figure 5:
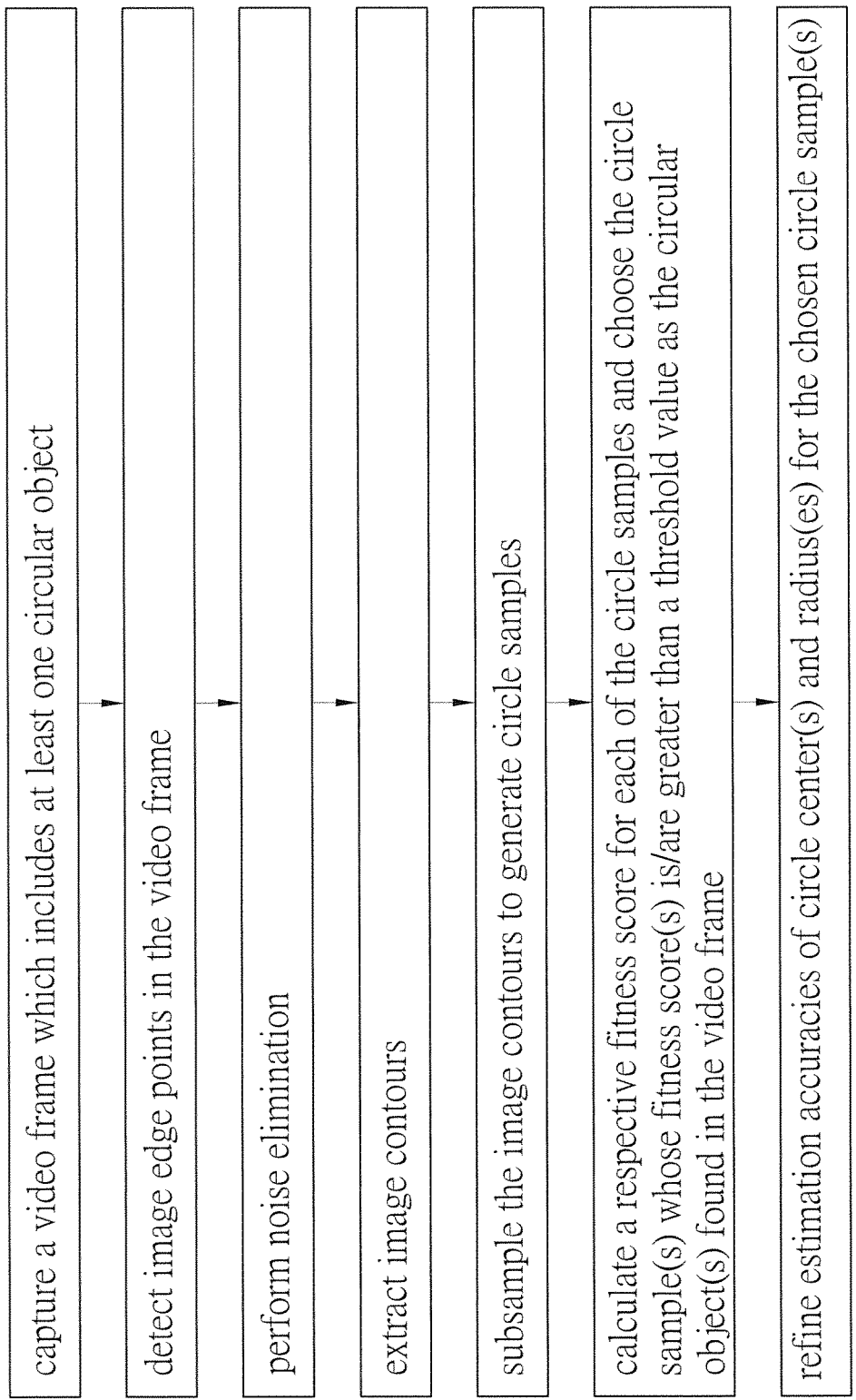
FIG. 5 is a flowchart showing the processing steps of the circular object localization method in accordance with an embodiment of the present invention.

Referring to FIG. 5 in conjunction with FIG. 3, the present invention also provides a method for localizing at least one circular object in a video frame, and the method can be coded as a computer program product to be stored in a non-transitory recording medium in order to be read and executed by a computer system such as a desktop computer, a laptop computer, a smartphone, a tablet computer, a personal digital assistant (PDA), etc. The computer program product may also be stored in a server in order to be downloaded online for installation. The method for localizing at least one circular object in a video frame may be utilized to localize, for example, a pupil image and includes the following processing steps to be performed by the foregoing system 100 for localizing an image of a circular object after the image capture unit 1 captures a video frame which includes an image of an eye (see FIG. 6A):

A. The edge computation module 2 (e.g., a Canny edge detector) performs edge detection to obtain a plurality of image edge points in the video frame (see FIG. 6B). To set an appropriate threshold value for obtaining the plurality of image edge points automatically, the edge detection process may incorporate, for example, automatic threshold value selection or iterative automatic threshold value selection.

After that, as shown in FIG. 6C to FIG. 6E, the first noise elimination module 21 and the second noise elimination module 22 perform a first noise elimination means and a second noise elimination means respectively. The first noise elimination means serves to remove the image edge points whose locations are within a predetermined range around the boundaries of bright image regions that are extracted to denote specular reflections of the supportive light of the image capture unit 1 from an eye surface, wherein the bright image regions are extracted by extracting at least one connected component of image pixels in the video frame whose pixel intensities are higher than a predetermined intensity threshold. The second noise elimination means serves to remove non-pupil image edge points whose locations are beyond a predetermined range of boundaries of dark image regions that are extracted to denote dark pupil areas, wherein the dark image regions are extracted by extracting at least one connected component of image pixels in the video frame whose pixel intensities are lower than a predetermined intensity threshold. The first noise elimination means and the second noise elimination means are hereinafter referred to as specular region processing (SRP) and pupil region processing (PRP), respectively. The two means of SRP and PRP can be regarded as preferred pre-processing steps for eliminating most of the unnecessary image edge points.

B. The contour extraction module 3 links neighboring image edge points to extract a contour set $\bar{\Phi}$ of image contours $\phi$. More specifically, the contour extraction module 3 links the neighboring image edge points via computing connected components of the image edge points, and each of the image contours $\phi$ has a contour structure represented by a list of the neighboring image edge points arranged in a sequential order. Specifically, the contour set $\bar{\Phi}$ consists of saying e image contours $\phi_1, \ldots, \phi_l$, wherein the contour structure of the ith image contour $\phi_i = \{P_{i,1}, \ldots, P_{i,n_i}\}$ is represented by a list of $n_i$ image edge points, $P_{i,1}, \ldots, P_{i,n_i}$, with the sequential order of the $n_i$ image edge points of the list derived by the computation of a respective one of the connected components. Preferably, the contour extraction module 3 further computes geometric structures of the image contours $\phi$, wherein the geometric structures of the image contours $\phi$ may be obtained by computing curvatures of the image points of each image contour according to the sequential order of its image edge points.

Figure 7:
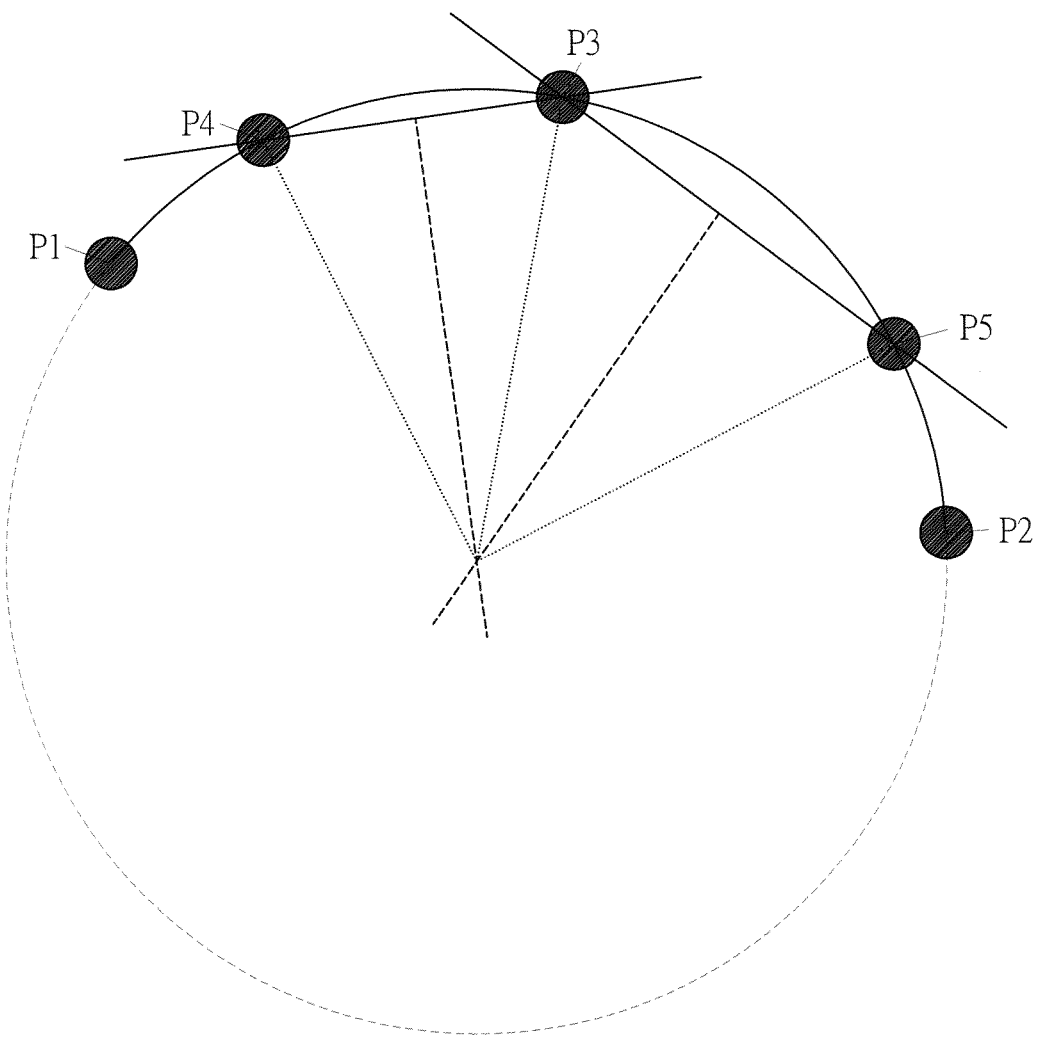
FIG. 7 schematically shows an embodiment of the structural sampling process of the present invention, wherein the solid curve denotes an extracted image contour and the dotted curve denotes a generated circle sample.

C. The sampling module 4 generates a plurality of circle samples according to the image contours $\phi$ (e.g., according to the geometric structure of the image contours $\phi$) by a structural sampling process. The structural sampling process subsamples the image contours, with respect to their contour structures, to obtain a plurality of point sets, and to generate the circle samples with center coordinates and radii for the point sets, wherein each of the point sets contains at least three image edge points (such as any three of P1, P2, P3, P4, and P5 in FIG. 7). More specifically, the point sets can be obtained at least in the following ways:

In the first way, the structural sampling process includes subsampling the contour set $\bar{\Phi}$ to obtain a plurality of image contours $\phi$, and selecting at least three image edge points from the obtained image contours $\phi$ to form a respective one of the point sets with which a respective one of the circle sample can be generated. Criteria for obtaining the plurality of image contours $\phi$ from the contour set $\bar{\Phi}$ in the structural sampling process include selecting the image contours $\phi$ with longer lengths, with higher curvatures, and/or with preferred pixel intensities.

In the second way, the structural sampling process includes subsampling the contour set $\bar{\Phi}$ to obtain one of the image contours $\phi$ with n image edge points, and selecting at least three image edge points from the obtained image contour $\phi$ to form a respective one of the point sets with which a respective one of the circle samples can be generated. More specifically, the at least three image edge points are selected either randomly or sequentially based on the order of the n image edge points, $P_1, \ldots, P_n$, of the image contour $\phi = \{P_1, \ldots, P_n\}$.

In the third way, the structural sampling process includes the following steps: a. pairing successively the image edge points at different ends of a respective one of the image contours $\phi = \{P_1, \ldots, P_n\}$ toward its middle section to obtain a set $\mathcal{S}$ of point pairs, wherein the set $\mathcal{S} = \{P_1, P_n), (P_2, P_{n-1}), \ldots, (P_k, P_{k+1})\}$ consists of saying $k$ point pairs; b. selecting one of the point pairs $(P_a, P_b)$ from the set $\mathcal{S}$; and subsampling the image edge points between the image edge points $P_a$ and $P_b$ of the selected point pair $(P_a, P_b)$ to obtain a specific image edge point $P_c$, thereby generating a respective one of the circle samples with the image edge points $P_a$, $P_b$ of the selected point pair $(P_a, P_b)$ and the specific image edge point $P_c$; and c. repeating step b for $m$ times, wherein $0 < m \leq k$, to obtain $m$ circle samples. This way is hereinafter referred to as contour point sampling (CPS).

D: The circular object localization module 5 calculates a respective fitness score for each of the circle samples by measuring the supporting evidence of the image edge points on a neighborhood of the circumference of each of the circle samples and chooses the circle sample(s) whose fitness score(s) is/are greater than a threshold value as the circular object(s) (e.g., the pupil) found in the video frame. Note here that the fitness score of the supporting evidence of the circle sample can be, for example, implemented by computing the number of image edge points located around the boundary of the circle sample, computing the number of image edge points that have a similar curvature to the circle sample, computing the number of image edge points whose intensities are similar to the target circle object (e.g., pupil black), etc.

Preferably, the refinement module 7, corresponding to the last refinement step in FIG. 5, for performing the least-square fitting of circle is also included to refine the estimation accuracies of circle center(s) and radius(es) of the found circular object(s) by using the image edge points around the circular object(s) derived in step D for the fitting. Using the circle estimate obtained in step D as a reliable approximation of the pupil, we further apply the least-square fitting to the computation of a more accurate pupil circle. Owing to the fact that the least-square fitting is sensitive to outliers, we have to delete the image edge points that are not close to the perimeter of the initial circle estimate obtained by step D, prior to the fitting. Then a stable and precise estimation of the pupil circle can be attained using iterative least-square fitting with repetitive deletion of outsider image edge points around circle estimates.

TABLE 1

| (640 × 480) | Test eye | Real eye | Thin film blur | Motion blur | smoke | #GT frames | # frames |
|---|---|---|---|---|---|---|---|
| Video 1 | ✓ | | | ✓ | | 97 | 530 |
| Video 2 | ✓ | | ✓ | | | 103 | 201 |

TABLE 1-continued

| (640 × 480) | Test eye | Real eye | Thin film blur | Motion blur | smoke | #GT frames | # frames |
|---|---|---|---|---|---|---|---|
| Video 3 | ✓ | | | ✓ | ✓ | 67 | 319 |
| Video 4 | | ✓ | | ✓ | | 81 | 939 |
| Video 5 | | ✓ | | ✓ | | 40 | 496 |

As summarized in Table 1, five video sequences are used as benchmarks to assess the performances of the proposed CPS method in pupil localization. While a plastic test eye is used in the first three videos for experimental simulations, a real eye is captured in Videos 4 and 5. To simulate the challenging conditions of blurs and specularity effects, we put a thin film to the camera lens to constantly generate gently-blurred images with amplified specular reflections in Video 2. As motion blurs can be found in Videos 1, 3, 4 and 5, surgical smoke is mimicked in Video 3 using incense sticks. For the processing of these 640×480 videos, our single-threaded implementation of the proposed CPS method achieves about 21 fps on a notebook of Intel Core i7-3517U, 1.9 GHz CPU.

Figure 8:
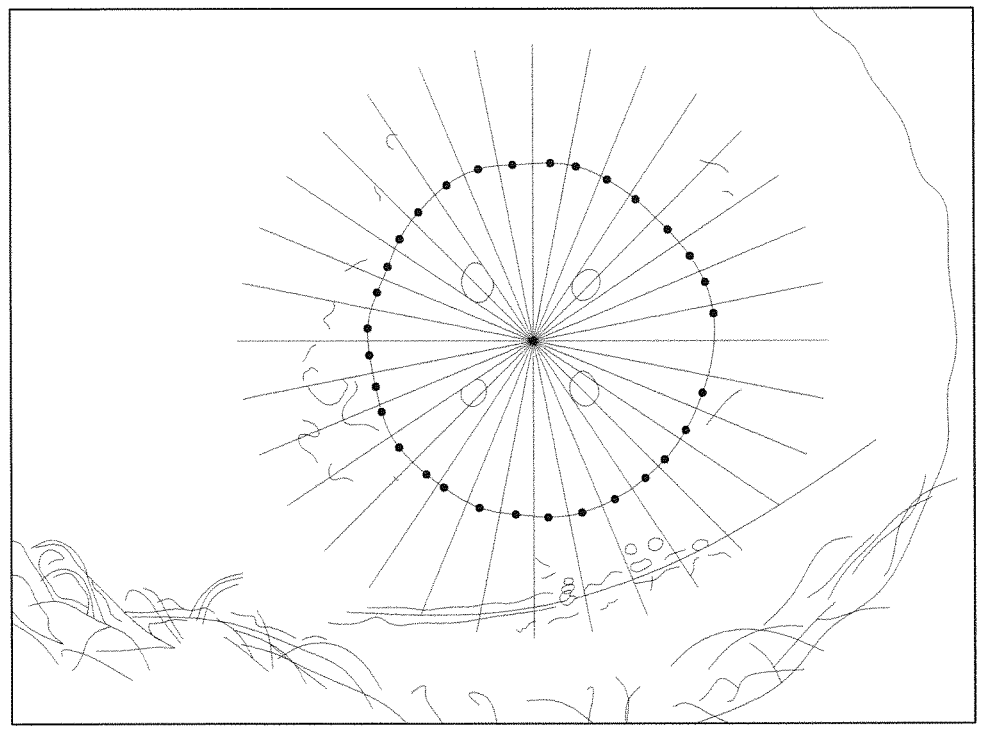
FIG. 8 schematically shows an example of manually-labeled image edge points in angular bins for the estimation of a ground-truth pupil center.
Figure 10:
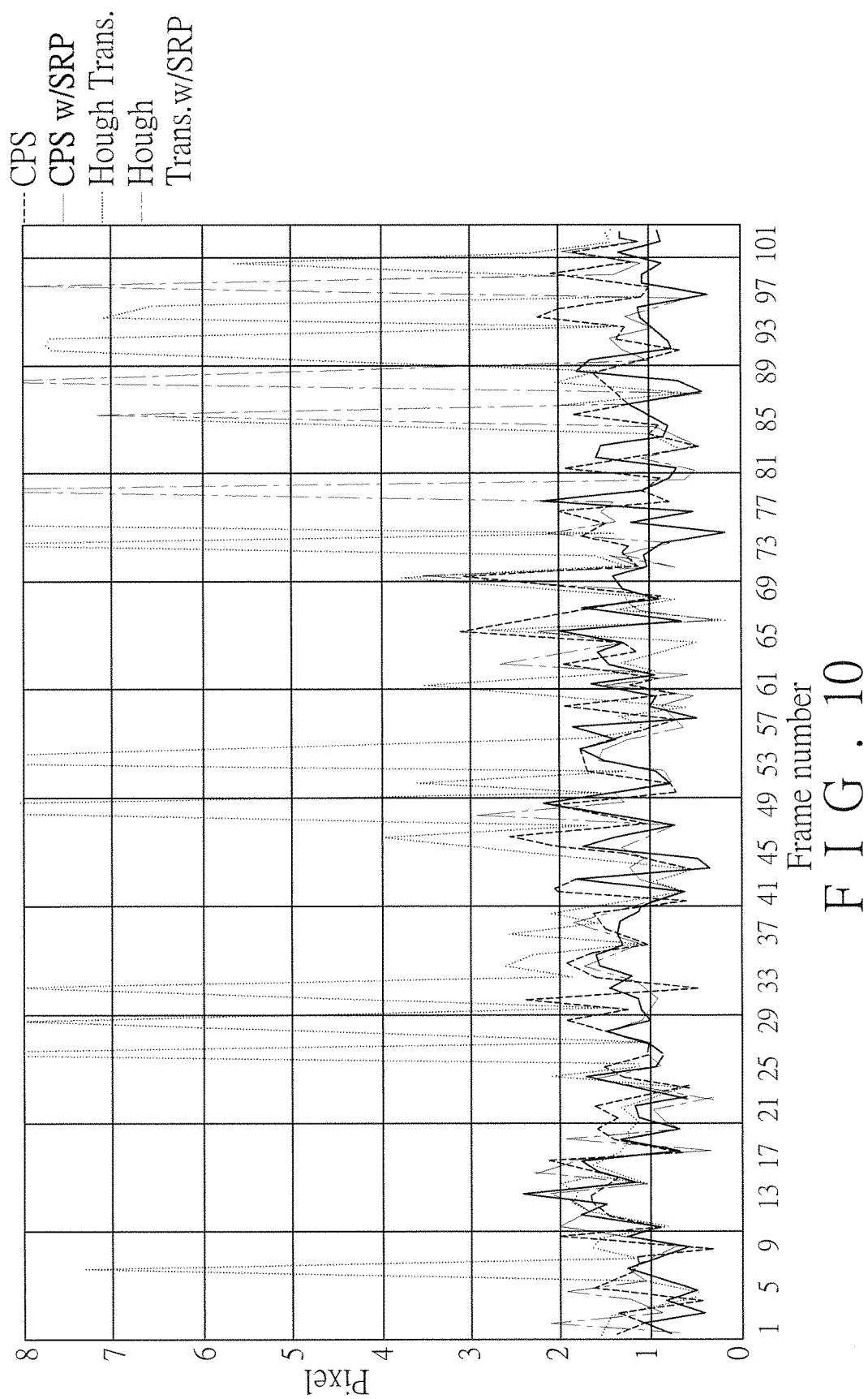
FIG. 10 shows the experimental comparison of the errors of pupil center localization for the video frames in the benchmark video 2 using four different methods, namely the Hough transform method without and with specular region processing (SRP) and the proposed contour point sampling method without and with specular region processing (SRP)
Figure 11:
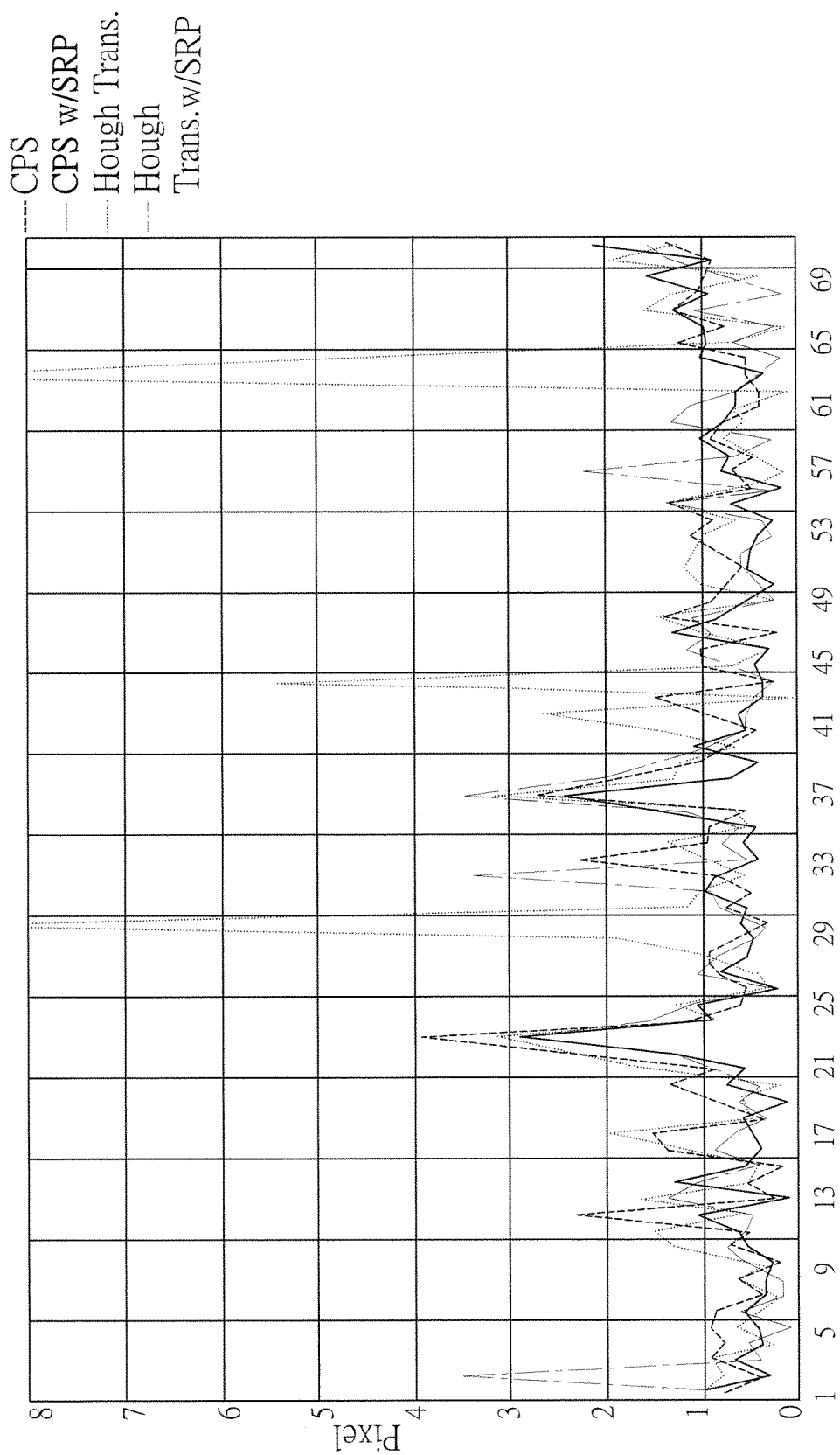
FIG. 11 shows the experimental comparison of the errors of pupil center localization for the video frames in the benchmark video 3 using four different methods, namely the Hough transform method without and with specular region processing (SRP) and the proposed contour point sampling method without and with specular region processing (SRP)
Figure 12:
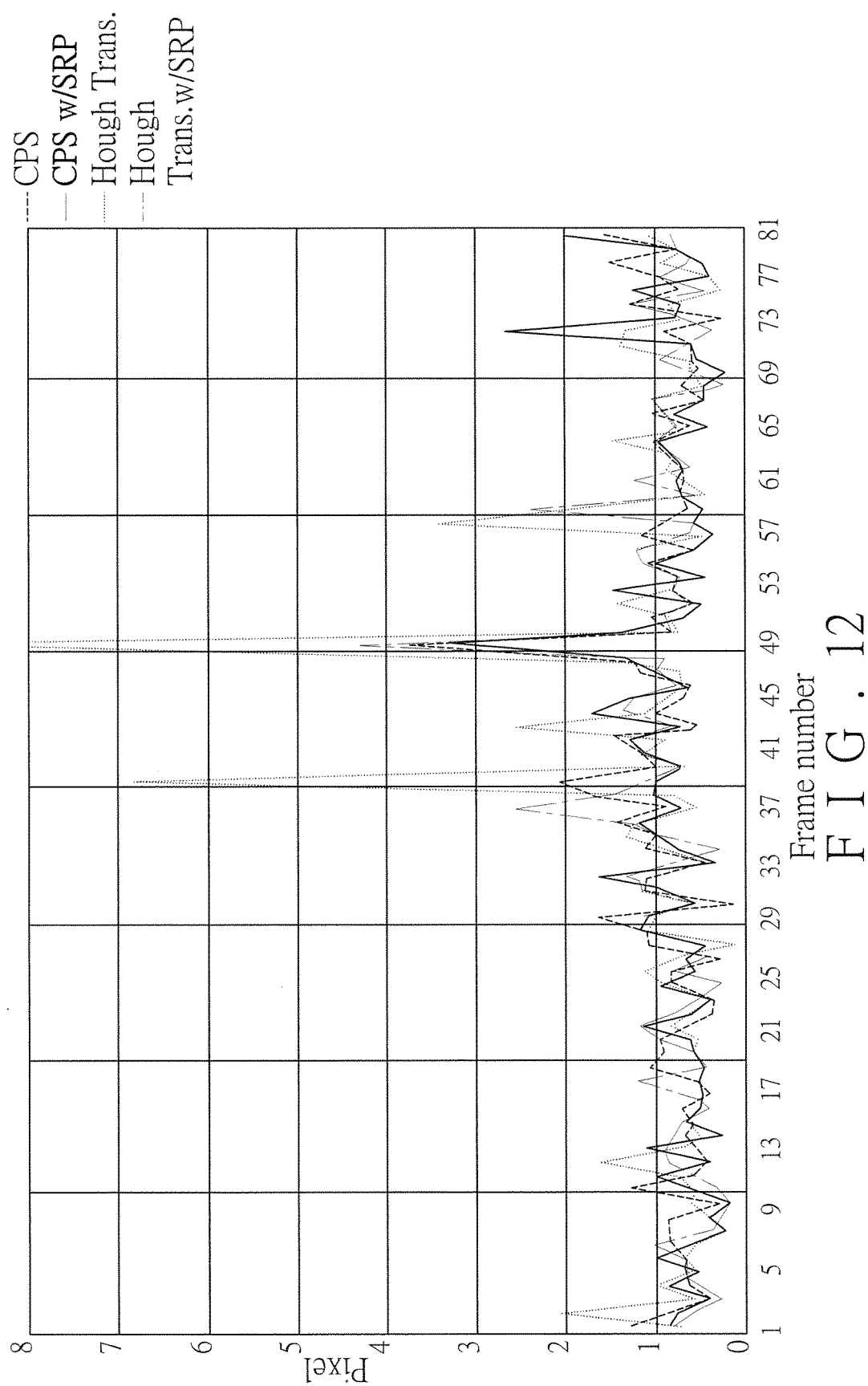
FIG. 12 shows the experimental comparison of the errors of pupil center localization for the video frames in the benchmark video 4 using four different methods, namely the Hough transform method without and with specular region processing (SRP) and the proposed contour point sampling method without and with specular region processing (SRP)

It is not a trivial task to specify the ground-truth (GT) pupil centers in benchmark video frames. In video frames, precise pupil centers at pixel-level accuracy can hardly be labeled by human hands and visual inspections. To overcome the problem of deriving GT pupil centers, we propose to use an auxiliary area partitioner, as shown in FIG. 8, to guide the artificial labeling of image markers on pupil boundaries in angular bins. These image markers are regarded as clean and reliable pupil image edge points, and are then used to compute reference pupil centers as ground-truth by using least-square fitting.

We compare the proposed CPS method with the popular Hough transform for pupil localization in our experiments. Note that we apply the same pre-processing step of pupil region processing (PRP) and post-processing step of the least-square fitting, but leave the pre-processing step of specular region processing (SRP) as an optional choice for the methods in comparison. Table 2 shows the experimental results of localization errors of pupil centers (in pixel) between four methods, namely the Hough transform method without and with SRP and the proposed CPS method without and with SRP, applied to the five benchmark videos. The proposed CPS method with SRP gives the lowest localization errors (in average) while the proposed CPS method without SRP also delivers promising localization accuracy, as compared with the large errors of Hough transform without SRP. These experiment results validate the robustness of the proposed CPS method to outlier image edge points. Detailed error distribution of the video frames of each benchmark video can be found in FIG. 9 to FIG. 13.

TABLE 2

| Mean Err. (Std.) | Hough Trans. | Hough Trans. w/SRP | CPS | CPS w/SRP |
|---|---|---|---|---|
| Video 1 | 2.426 (2.485) | 1.422 (1.706) | 1.095 (0.531) | 0.964 (0.439) |
| Video 2 | 2.947 (2.830) | 1.580 (1.562) | 1.417 (0.559) | 1.165 (0.445) |
| Video 3 | 1.294 (1.742) | 0.869 (0.765) | 0.916 (0.653) | 0.852 (0.585) |
| Video 4 | 1.083 (1.271) | 0.887 (0.557) | 0.901 (0.482) | 0.836 (0.496) |
| Video 5 | 1.036 (0.718) | 0.979 (0.589) | 0.999 (0.670) | 0.977 (0.569) |

In summary, in one aspect of the present invention, the method of circular object localization is executed on a computer system with video frames captured by a an image capture unit and includes the steps of: A. performing edge detection to obtain a plurality of image edge points in a video frame; B. extracting a contour set of image contours by linking neighboring image edge points as the image contours, each of which has a contour structure represented by a list of the neighboring image edge points arranged in a sequential order; C. generating a plurality of circle samples from the extracted contour set by a structural sampling process that subsamples the image contours in the extracted contour set, with respect to their contour structures, to obtain a plurality of point sets, and to generate the circle samples with center coordinates and radii for the point sets, wherein each of the point sets contains at least three image edge points; and D. localizing the at least one circular object from the generated circle samples by calculating a respective fitness score for each of the circle samples to measure the supporting evidence of the image edge points on a neighborhood of the circumference of each of the circle samples, and by choosing the circle sample(s) whose fitness score(s) is/are greater than a threshold value as the circular object(s) found in the video frame.

Preferably, in step B, linking neighboring image edge points as image contours is implemented via computing connected components of the image edge points. Consequently, a contour set $\bar{\Phi} = \{\phi_1, \ldots, \phi_l\}$ consisting of saying l image contours is formed, wherein the structure of an ith image contour $\phi_i = \{P_{i,1}, \ldots, P_{i,n_i}\}$ is represented by a list of $n_i$ image edge points, $P_{i,1}, \ldots, P_{i,n_i}$, with the sequential order of the $n_i$ image edge points being derived by the computation a respective one of the connected components.

Preferably, the structural sampling process in step C includes subsampling the contour set $\bar{\Phi}$ to obtain a plurality of the image contours $\phi$, and selecting at least three image edge points from the obtained image contours $\phi$ to form a respective one of the point sets for generating a respective one of the circle samples.

Preferably, the structural sampling process in step C includes subsampling one of the image contours $\phi$ with n image edge points, based on its contour structure represented by the sequential order of the n image edge points $\phi = \{P_1, \ldots, P_n\}$, to obtain a respective one of the point sets by selecting at least three image edge points from the subsampled image contours $\phi$ for generating a respective one of the circle samples.

Preferably, the structural sampling process includes the steps of: a. pairing successively the image edge points at different ends of a respective one of the image contours $\phi = \{P_1, \ldots, P_n\}$ toward its middle section to obtain a set $S = \{(P_1, P_n), (P_2, P_{n-1}), \ldots, (P_k, P_{k+1})\}$ consisting of saying $k$ point pairs; b. selecting one of the point pairs $(P_a, P_b)$ from the set $S$ and subsampling the image edge points between the image edge points $P_a$ and $P_b$ of the selected point pair $(P_a, P_b)$ to obtain a specific image edge point $P_c$ for generating a respective one of the circle sample with the edge points $P_a$, $P_b$ and $P_c$; and c. repeating step b for $m$ times, wherein $0<m\leq k$, to obtain $m$ circle samples.

Preferably, step B further includes computing geometric structures of the image contours $\phi$ for the subsequent step C of generating a plurality of circle samples with respect to the geometric structures of the image contours $\phi$, wherein computing geometric structures of the image contours includes computing curvatures of the image edge points of each image contour $\phi$ according to the sequential order of its image edge points.

Preferably, the video frame is an image of an eye captured by the image capture unit with supportive light; the circular object in the image is a pupil of the eye; and the method further includes a step, to be performed between step A and step B, of performing a noise elimination means to remove the image edge points whose locations are within a predetermined range around the boundaries of bright image regions that are identified as probable specular reflections of the supportive light of the image capture unit from an eye surface.

Preferably, the bright image regions are extracted by computing connected components of the image pixels in the video frame whose pixel intensities are higher than a predetermined intensity threshold.

Preferably, the video frame is an image of an eye captured by the image capture unit; the circular object in the image is a pupil of the eye; and the method further includes a step, to be performed between step A and step B, of performing a noise elimination means to remove non-pupil image edge points whose locations are beyond a predetermined range around the boundaries of dark image regions that are identified as probable dark pupil areas.

Preferably, the dark image regions are extracted by computing connected components of the image pixels in the video frame whose pixel intensities are lower than a predetermined intensity threshold.

Preferably, the method further includes a refinement step, to be performed after step D, of performing the least-square fitting of circle to refine the estimation accuracies of circle center(s) and radius(es) of the found circular object(s) by using the image edge points around the circular object(s) derived in step D for the fitting.

In another aspect of the present invention, the present invention can also be embodied by a system for localizing at least one circular object in a video frame captured by an image capture unit. The system comprises: an edge computation module configured for performing edge detection in order to obtain a plurality of image edge points in the video frame; a contour extraction module coupled to the edge computation module and configured for linking neighboring image edge points as image contours; a sampling module coupled to the contour extraction module and configured for generating a plurality of circle samples according to the image contours by a structural sampling process that subsamples the image contours, with respect to their contour structures, to obtain a plurality of point sets, and to generate circle samples with center coordinates and radii for the point sets, wherein each of the point sets contains at least three image edge points; and a circular object localization module coupled to the sampling module and configured for calculating a respective fitness score for each of the circle samples to measure the supporting evidence of the image edge points on a neighborhood of the circumference of each of the circle samples, and for choosing the circle sample(s) whose fitness score is/are greater than a threshold value as the circular object(s) found in the video frame.

Preferably, the video frame is an image of an eye captured by the image capture unit with supportive light; the circular object in the image is a pupil of the eye; and the system further comprises a first noise elimination module coupled to the edge computation module and configured for performing a noise elimination means to remove the image edge points whose locations are within a predetermined range around the boundaries of bright image regions that are identified as probable specular reflections of the supportive light of the image capture unit from an eye surface.

Preferably, the video frame is an image of an eye captured by the image capture unit; the circular object in the image is a pupil of the eye; and the system further includes a second noise elimination module coupled to the edge computation module and configured for performing a noise elimination means to remove non-pupil image edge points whose locations are beyond a predetermined range around the boundaries of dark image regions that are identified as probable dark pupil areas.

Preferably, the system further comprises a refinement module coupled to the circular object localization module and configured for performing the least-square fitting of circle to refine the estimation accuracies of circle center(s) and radius(es) of the circular object(s) found in the video frame by using the image edge points around the circular object(s) derived by the circular object localization module for the fitting.

Preferably, the system applied to pupil tracking for excimer laser eye surgery further includes an eyeball stabilizer that is provided with the image capture unit for contacting and stabilizing an eyeball at a predetermined position to facilitate inspection and treatment during the eye surgery.

In a further aspect of the present invention, a non-transitory computer readable medium with instructions stored thereon for localizing at least one circular object in a video frame captured by an image capture unit is also provided, and the instructions comprises: performing edge detection to obtain a plurality of image edge points in the video frame; extracting a contour set of image contours by linking neighboring image edge points as the image contours, each of which has a contour structure represented by a list of the neighboring image edge points arranged in a sequential order; generating a plurality of circle samples from the extracted contour set by a structural sampling process that subsamples the image contours in the extracted contour set, with respect to their contour structures, to obtain a plurality of point sets, and to generate circle samples with center coordinates and radii for the point sets, wherein each of the point sets contains at least three said image edge points; and localizing the at least one circular object from the generated circle samples by calculating a respective fitness score for each of the circle samples to measure the supporting evidence of the image edge points on a neighborhood of the circumference of each of the circle samples, and by choosing the circle sample(s) whose fitness score(s) is/are greater than a threshold value as the circular object(s) found in the video frame.

Accordingly, at least the following advantageous effects can be achieved:

1. The localization method according to an embodiment of the present invention is robust to image noises and/or outlier edges resulting from, e.g., specular reflections and iris textures, in localizing circular objects. According to the experiment results, the disclosed method achieves small errors (about 1 pixel) in localizing pupil centers.

2. Thanks to the structural sampling process in the localization method according to an embodiment of the present invention for generating high quality circle samples, the computational time in search of intended circular objects is largely reduced.

3. In addition to eye surgery, the localization method according to an embodiment of the present invention is applicable to other application fields, such as industrial inspection, where high precision of circular object localization is required.

The operation, use, and effects of the present invention have been demonstrated by the embodiments described above. However, the foregoing embodiments are only the preferred embodiments and are not intended to be restrictive of the present invention. All simple equivalent changes and modifications made according to the appended claims and the present specification should fall within the scope of the present invention.

What is claimed is:

1. A method executed on a computer system for localizing at least one circular object in a video frame captured by an image capture unit, the method comprising:
    A. performing edge detection to obtain a plurality of image edge points in the video frame;
    B. extracting a contour set $\overline{\Phi}$ of image contours $\phi$ by linking neighboring image edge points as said image contours $\phi$, each of which has a contour structure represented by a list of said neighboring image edge points arranged in a sequential order;
    C. generating a plurality of circle samples from the extracted contour set $\overline{\Phi}$ by a structural sampling process that subsamples the image contours $\phi$ in the extracted contour set $\overline{\Phi}$, with respect to their contour structures, to obtain a plurality of point sets and to generate the circle samples with center coordinates and radii for the point sets, wherein each of the point sets contains at least three said image edge points; and
    D. localizing the at least one circular object from the generated circle samples by calculating a respective fitness score for each of the circle samples to measure the supporting evidence of the image edge points on a neighborhood of the circumference of each of the circle samples, and by choosing at least one of the circle sample(s) whose fitness score(s) is/are greater than a threshold value as the at least one circular object(s) found in the video frame.

2. The method of claim 1, wherein in operation B, said linking neighboring image edge points as said image contours $\phi$ is implemented by computing connected components of the image edge points; and the contour set $\overline{\Phi}=\{\phi_1, \ldots, \phi_l\}$ consists of saying l image contours $\phi$, wherein the contour structure of an ith image contour $\phi_i=\{P_{i,1}, \ldots, P_{i,n_i}\}$ is represented by a list of $n_i$ image edge points, $P_{i,1} \ldots, P_{i,n_i}$, with the sequential order of the $n_i$ image edge points derived by the computation of a respective one of the connected components.

3. The method of claim 1, wherein the structural sampling process in operation C includes subsampling the contour set $\overline{\Phi}$ to obtain a plurality of said image contours $\phi$, and selecting at least three image edge points from the obtained image contours $\phi$ to form a respective one of the point sets for generating a respective one of the circle samples.

4. The method of claim 1, wherein the structural sampling process in operation C includes subsampling one of the image contours $\phi$ with n image edge points, based on its contour structure represented by the sequential order of the n image edge points $\phi=\{P_1, \ldots, P_n\}$, to obtain a respective one of the point sets by selecting at least three image edge points from the subsampled image contours $\phi$ for generating a respective one of the circle samples.

5. The method of claim 1, wherein the structural sampling process includes:
    a. pairing successively the image edge points at different ends of a respective one of the image contours $\phi=\{P_1, \ldots, P_n\}$ toward its middle section to obtain a set $S$ $\{(P_1, P_n), (P_2, P_{n-1}), \ldots, (P_k, P_{k+1})\}$ consisting of saying $k$ point pairs;
    b. selecting one of the point pairs $(P_a, P_b)$ from the set $S$; and subsampling the image edge points between the image edge points $P_a$ and $P_b$ of the selected point pair $(P_a, P_b)$ to obtain a specific image edge point $P_c$ for generating a respective one of the circle sample with the image edge points $P_a$, $P_b$ and $P_c$; and
    c. repeating operation b for $m$ times, wherein $0<m \leq k$, to obtain $m$ said circle samples.

6. The method of claim 1, wherein operation B further includes computing geometric structures of the image contours $\phi$ for the subsequent operation C of generating a plurality of circle samples with respect to the geometric structures of the image contours $\phi$; and wherein said computing geometric structures of the image contours $\phi$ includes computing curvatures of the image edge points of each image contour according to the sequential order of its image edge points.

7. The method of claim 1, wherein the video frame is an image of an eye captured by the image capture unit with supportive light; the circular object in the image is a pupil of the eye; and the method further includes an operation, to be performed between operation A and operation B, of performing a noise elimination means to remove the image edge points whose locations are within a predetermined range around boundaries of bright image regions that are identified as probable specular reflections of the supportive light of the image capture unit from an eye surface.

8. The method of claim 7, wherein the bright image regions are extracted by computing connected components of image pixels in the video frame whose pixel intensities are higher than a predetermined intensity threshold.

9. The method of claim 1, wherein the video frame is an image of an eye captured by the image capture unit; the circular object in the image is a pupil of the eye; and the method further includes an operation, to be performed between operation A and operation B, of performing a noise elimination means to remove non-pupil image edge points whose locations are beyond a predetermined range around boundaries of dark image regions that are identified as probable dark pupil areas.

10. The method of claim 9, wherein the dark image regions are extracted by computing connected components of image pixels in the video frame whose pixel intensities are lower than a predetermined intensity threshold.

11. The method of claim 1, further including a refinement operation, to be performed after operation D, of performing a least-square fitting of circle to refine estimation accuracies of circle center(s) and radius(es) of the found circular object(s) by using the image edge points around the circular object(s) derived in operation D for the fitting.

12. A system for localizing at least one circular object in a video frame captured by an image capture unit comprising:
    an edge computation module executed on a processor to perform edge detection and thereby obtain a plurality of image edge points in the video frame;
    a contour extraction module coupled to the edge computation module and executed on a processor to link neighboring image edge points as image contours;

a sampling module coupled to the contour extraction module and executed on a processor to generate a plurality of circle samples according to the image contours by a structural sampling process that sub-samples the image contours, with respect to their contour structures, to obtain a plurality of point sets, and to generate circle samples with center coordinates and radii for the point sets, wherein each of the point sets contains at least three said image edge points; and a circular object localization module coupled to the sampling module and executed on a processor to calculate a respective fitness score for each of the circle samples to measure the supporting evidence of the image edge points on a neighborhood of the circumference of each of the circle samples, and choose the circle sample(s) whose fitness score(s) is/are greater than a threshold value as the circular object(s) found in the video frame.

13. The system of claim 12, wherein the video frame is an image of an eye captured by the image capture unit with supportive light; the circular object in the image is a pupil of the eye; and the system further includes a first noise elimination module coupled to the edge computation module and executed on a processor to perform noise elimination removing the image edge points whose locations are within a predetermined range around boundaries of bright image regions identified as probable specular reflections of the supportive light of the image capture unit from an eye surface.

14. The system of claim 12, wherein the video frame is an image of an eye captured by the image capture unit; the circular object in the image is a pupil of the eye; and the system further includes a second noise elimination module coupled to the edge computation module and executed on a processor to perform noise elimination removing non-pupil image edge points whose locations are beyond a predetermined range around boundaries of dark image regions identified as probable dark pupil areas.

15. The system of claim 12, further comprising a refinement module coupled to the circular object localization module and executed on a processor to perform a least-square fitting of circle to refine estimation accuracies of circle center(s) and radius(es) of the circular object(s) found in the video frame by using the image edge points around the circular object(s) derived by the circular object localization module for the fitting.

16. A non-transitory computer readable medium with instructions stored thereon for localizing at least one circular object in a video frame captured by an image capture unit, the instructions comprising:

performing edge detection to obtain a plurality of image edge points in the video frame;

extracting a contour set of image contours by linking neighboring image edge points as said image contours, each of which has a contour structure represented by a list of said neighboring image edge points arranged in a sequential order;

generating a plurality of circle samples from the extracted contour set by a structural sampling process that sub-samples the image contours in the extracted contour set, with respect to their contour structures, to obtain a plurality of point sets, and to generate circle samples with center coordinates and radii for the point sets, wherein each of the point sets contains at least three said image edge points; and localizing the at least one circular object from the generated circle samples by calculating a respective fitness score for each of the circle samples to measure the supporting evidence of the image edge points on a neighborhood of the circumference of each of the circle samples, and by choosing the circle sample(s) whose fitness score(s) is/are greater than a threshold value as the circular object(s) found in the video frame.

* * * * *